US012609354B2

(12) United States Patent
Lee et al.

(10) Patent No.: US 12,609,354 B2
(45) Date of Patent: Apr. 21, 2026

(54) NON-AQUEOUS ELECTROLYTE SOLUTION COMPRISING A DIALKYLENENITRILE-CONTAINING PYRIDINE ADDITIVE FOR LITHIUM SECONDARY BATTERY AND LITHIUM SECONDARY BATTERY COMPRISING SAME

(71) Applicant: LG Energy Solution, Ltd., Seoul (KR)

(72) Inventors: Jungmin Lee, Daejeon (KR); Chuleun Yeom, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 694 days.

(21) Appl. No.: 17/918,752

(22) PCT Filed: Jan. 6, 2022

(86) PCT No.: PCT/KR2022/000231

§ 371 (c)(1),
(2) Date: Oct. 13, 2022

(87) PCT Pub. No.: WO2022/149875

PCT Pub. Date: Jul. 14, 2022

(65) Prior Publication Data

US 2023/0137991 A1 May 4, 2023

(30) Foreign Application Priority Data

Jan. 7, 2021 (KR) ........................ 10-2021-0001813

(51) Int. Cl.

| | |
|---|---|
| ***H01M 10/056*** | (2010.01) |
| ***H01M 10/0525*** | (2010.01) |
| ***H01M 10/0567*** | (2010.01) |
| ***H01M 10/0568*** | (2010.01) |
| ***H01M 10/0569*** | (2010.01) |
| ***H01M 50/46*** | (2021.01) |

(52) U.S. Cl.

CPC ... *H01M 10/0567* (2013.01); *H01M 10/0525* (2013.01); *H01M 10/0568* (2013.01); *H01M 10/0569* (2013.01); *H01M 50/46* (2021.01); *H01M 2300/0028* (2013.01)

(58) Field of Classification Search

CPC ......... H01M 10/0567; H01M 10/0566; H01M 10/0568; H01M 10/0569; H01M 10/0525; H01M 10/052; H01M 50/46; H01M 2300/0028

See application file for complete search history.

(56) References Cited

U.S. PATENT DOCUMENTS

| | | | |
|---|---|---|---|
| 5,879,834 | A | 3/1999 | Mao |
| 2002/0025477 | A1 | 2/2002 | Itagaki et al. |
| 2008/0311481 | A1 | 12/2008 | Kim et al. |
| 2014/0050991 | A1 | 2/2014 | Kim |
| 2018/0062207 | A1 | 3/2018 | Matsuoka |

FOREIGN PATENT DOCUMENTS

| | | | | | |
|---|---|---|---|---|---|
| CN | 103441303 | A | | 12/2013 | |
| CN | 107460497 | A | | 12/2017 | |
| CN | 109193028 | A | | 1/2019 | |
| CN | 109994779 | A | | 7/2019 | |
| CN | 111446501 | A | * | 7/2020 | ........ H01M 10/4235 |
| CN | 109802177 | B | | 10/2020 | |
| CN | 113299971 | A | | 8/2021 | |
| IN | 111446501 | A | | 7/2020 | |
| JP | 2002093462 | A | | 3/2002 | |
| JP | 2002260725 | A | | 9/2002 | |
| KR | 100865402 | B1 | | 10/2008 | |
| KR | 20140024079 | A | | 2/2014 | |
| KR | 20150022656 | A | | 3/2015 | |
| KR | 101735857 | B1 | | 5/2017 | |
| KR | 20170105590 | A | | 9/2017 | |
| WO | 2009051702 | A1 | | 4/2009 | |
| WO | 2017029176 | A1 | | 2/2017 | |
| WO | 2019128160 | A1 | | 7/2019 | |
| WO | 2019183351 | A1 | | 9/2019 | |
| WO | 2020069619 | A1 | | 4/2020 | |

OTHER PUBLICATIONS (Computer-generated translation of CN-111446501) Ge et al., "Electrolyte Containing -F And -B Group Compound And Electrochemical Device Thereof", Jul. 24, 2020.*

International Search Report for Application No. PCT/KR2022/000231 mailed Apr. 12, 2022, pp. 1-4.

* cited by examiner

*Primary Examiner* — Raymond Alejandro
(74) *Attorney, Agent, or Firm* — Lerner David LLP

(57) ABSTRACT

Provided are a non-aqueous electrolyte solution for a lithium secondary battery comprising a lithium salt, an organic solvent, and a dialkylenenitrile-containing pyridine additive, and a lithium secondary battery comprising the same, where such non-aqueous electrolyte solution reduces the resistance and swelling phenomenon of the lithium secondary battery under high voltage.

10 Claims, No Drawings

NON-AQUEOUS ELECTROLYTE SOLUTION COMPRISING A DIALKYLENENITRILE-CONTAINING PYRIDINE ADDITIVE FOR LITHIUM SECONDARY BATTERY AND LITHIUM SECONDARY BATTERY COMPRISING SAME

CROSS-REFERENCE TO RELATED APPLICATIONS

The present application is a national stage entry under 35 U.S.C. § 371 of International Application No. PCT/KR2022/000231 filed on Jan. 6, 2022, which claims priority from Korean Patent Application No. 10-2021-0001813 filed on Jan. 7, 2021, all the disclosures of which are incorporated herein by reference.

TECHNICAL FIELD

The present invention relates to a non-aqueous electrolyte solution for a lithium secondary battery capable of reducing the resistance and swelling phenomenon of the battery under high voltage and a lithium secondary battery including the same.

BACKGROUND ART

Recently, portable electronic devices have been widely distributed, and accordingly, with respect to the battery, which is their power source, along with the rapid miniaturization, weight reduction, and thinning of these portable electronic devices, there is a strong demand for the development of a secondary battery that is small and lightweight, can be charged and discharged for a long time, and has excellent high-rate characteristics.

Among the secondary batteries currently being applied, the lithium secondary battery developed in the early 1990s is attracting much attention as there is an advantage in that it has much higher operating voltage and energy density than conventional batteries such as Ni—Mn, Ni—Cd, and sulfuric acid-lead batteries using an electrolyte solution in the form of an aqueous solution. However, these lithium secondary batteries have safety problems such as ignition and explosion due to the use of an aqueous electrolyte solution, and these problems become more severe as the capacity density of the battery is increased.

In the secondary battery using a non-aqueous electrolyte solution, the decrease in the safety of the battery that occurs during continuous charging is a major problem. One of the causes that can affect this is heat generation due to the collapse of the structure of the positive electrode. Its working principle is as follows. That is, a positive electrode active material for a battery using a non-aqueous electrolyte solution consists of lithium-containing metal oxides that can intercalate and de-intercalate lithium and/or lithium ions, and such a positive electrode active material is transformed into a thermally unstable structure as a large amount of lithium is released when overcharging. Due to external physical impact, such as exposure to high temperature in such an overcharged state, when the temperature of the battery reaches the critical temperature, oxygen is released from the positive electrode active material with an unstable structure, and the released oxygen causes an exothermic decomposition reaction with the solvent of the electrolyte solution. In particular, since the combustion of the electrolyte solution is further accelerated by the oxygen released from the positive electrode, this exothermic chain reaction causes the battery to fire and burst phenomenon due to thermal runaway.

A method of adding an aromatic compound as a redox shuttle additive to an electrolyte solution is used to control ignition or explosion due to the increase in temperature inside the battery as described above. For example, Japanese Laid-open Patent Publication No. 2002-260725 discloses a non-aqueous lithium-ion battery capable of preventing overcharge current and thermal runaway caused thereby by using aromatic compounds such as biphenyl. In addition, U.S. Pat. No. 5,879,834 also describes a method for improving the safety of the battery, by adding a small amount of aromatic compounds such as biphenyl and 3-chlorothiophene and thus increasing the internal resistance by electrochemical polymerization in an abnormal overvoltage condition.

However, in the case of using an additive such as biphenyl, when a locally and relatively high-voltage occurs in general operating voltage, it is gradually decomposed during the charging and discharging process, or when the battery is discharged at a high temperature for a long period of time, the amount of biphenyl is gradually reduced, and thus after 300 cycles of charging and discharging, there is a problem that safety cannot be guaranteed and a problem in storage characteristics, etc.

Meanwhile, research and development of high-voltage batteries (systems of 4.2V or higher) are continuously being conducted as a way to increase the charging amount of the electricity in order to increase the capacity of the battery while miniaturizing it. Even in the same battery system, as the charging voltage is increased, the charging amount is generally increased. However, there are safety problems such as decomposition of the electrolyte solution, insufficient space for lithium intercalation, and danger due to an increase in the potential of the electrode. Therefore, in order to make a battery operated at high voltage, the overall condition is managed by the system so that the standard reduction potential difference between the negative electrode active material and the positive electrode active material is easily maintained to be large, and the electrolyte solution does not decompose at this voltage.

Considering this aspect of the high-voltage battery, when conventional overcharge inhibitors such as biphenyl (BP) or cyclohexylbenzene (CHB) used in general lithium-ion battery is used, it can be easily seen that even during normal charging and discharging operation, many of these decompositions are made, and even at a slightly high temperature, the characteristics of the battery are rapidly deteriorated, thereby resulting in a problem of shortening the lifetime of the battery. In addition, if a commonly used non-aqueous carbonate-based solvent is used as an electrolyte solution, when charging with a voltage higher than the normal charging potential of 4.0V, there is a problem that due to the increase in oxidizing power, as the charging/discharging cycles are progressed, the decomposition reaction of the electrolyte solution is proceeded and the lifetime characteristics are rapidly deteriorated.

Therefore, in a high-voltage battery (a system of 4.2V or higher), there is a continuous demand for the development of a method for improving the swelling characteristics of the battery by suppressing the leaching of the transition metal from the positive electrode and reducing the generation of gas at high temperature.

PRIOR ART DOCUMENT

Patent Document (Patent Document 1) Japanese Laid-open Patent Publication No. 2002-260725

(Patent Document 2) U.S. Pat. No. 5,879,834

DISCLOSURE

Technical Problem

In order to solve the conventional problems, it is an object of the present invention to provide a non-aqueous electrolyte solution for a lithium secondary battery that can suppress the leaching of transition metals from a positive electrode in a high voltage state, and reduce the amount of gas generated at high temperatures, while maintaining good basic performance of high rate charging/discharging characteristics, lifetime characteristics, etc. thereby improving the swelling characteristics of the battery, by incorporating a pyridine-based additive containing two nitrile groups as an additive into the non-aqueous electrolyte solution for the lithium secondary battery, and a lithium secondary battery comprising the same.

In addition, it is another object of the present invention to provide a lithium secondary battery with improved capacity characteristics and safety while suppressing side reactions between a positive electrode and an electrolyte solution under high voltage and high temperature conditions, by comprising the non-aqueous electrolyte solution for the lithium secondary battery.

Technical Solution

In order to achieve the above objects, the present invention provides a non-aqueous electrolyte solution for a lithium secondary battery comprising a lithium salt, an organic solvent, and a pyridine-based additive containing two nitrile groups.

In addition, the present invention provides a non-aqueous electrolyte solution for a lithium secondary battery, wherein the pyridine-based additive is represented by the following Chemical Formula 1:

[Chemical Formula 1]

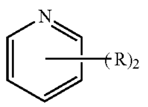

wherein R is -L-CN, and L is an alkylene group.

In addition, the present invention provides a non-aqueous electrolyte solution for a lithium secondary battery, wherein Chemical Formula 1 is represented by Chemical Formula 1-1 below:

[Chemical Formula 1-1]

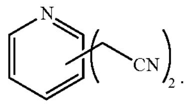

In addition, the present invention provides a non-aqueous electrolyte solution for a lithium secondary battery, wherein Chemical Formula 1 is represented by any one of the following compounds below:

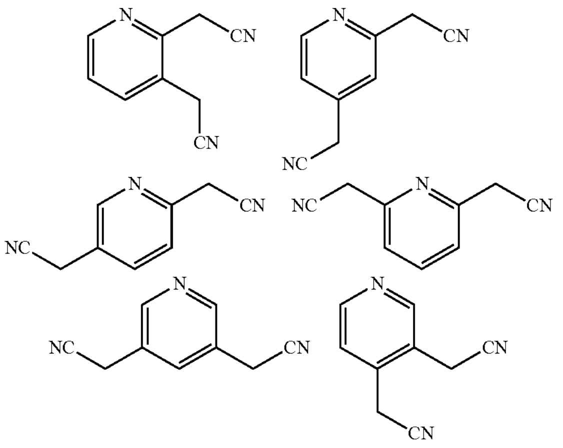

In addition, the present invention provides a non-aqueous electrolyte solution for a lithium secondary battery, wherein the pyridine-based additive is contained in an amount of 0.01 wt. % to 10 wt. %, relative to the total weight of the electrolyte solution.

In addition, the present invention provides a non-aqueous electrolyte solution for a lithium secondary battery, wherein the lithium salt is selected from the group consisting of LiCl, LiBr, LiI, $LiBF_4$, $LiClO_4$, $LiB_{10}Cl_{10}$, $LiAlCl_4$, $LiAlO_4$, $LiPF_6$, $LiCF_3SO_3$, $LiCH_3CO_2$, $LiCF_3CO_2$, $LiAsF_6$, $LiSbF_6$, $LiCH_3SO_3$, LiFSI (Lithium bis(fluorosulfonyl)imide, $LiN(SO_2F)_2$), LiBETI (lithium bisperfluoroethanesulfonimide, $LiN(SO_2CF_2CF_3)_2$) and LiTFSI (lithium (bis)trifluoromethanesulfonimide, $LiN(SO_2CF_3)_2$).

In addition, the present invention provides a non-aqueous electrolyte solution for a lithium secondary battery, wherein the concentration of the lithium salt is 0.1 M to 3 M.

In addition, the present invention provides a non-aqueous electrolyte solution for a lithium secondary battery, wherein the organic solvent contains at least one selected from the group consisting of ether, ester, amide, linear carbonate, and cyclic carbonate.

In addition, the present invention provides a non-aqueous electrolyte solution for a lithium secondary battery, wherein the lithium secondary battery has an operating voltage of 4.0V or higher.

In addition, the present invention provides a lithium secondary battery comprising a positive electrode, a negative electrode, a separator interposed between the positive electrode and the negative electrode, and the non-aqueous electrolyte solution for the lithium secondary battery as described above.

Advantageous Effects

According to the non-aqueous electrolyte solution for lithium secondary battery according to the present invention, the swelling phenomenon of the battery caused by oxidation/decomposition of the electrolyte solution at high voltage and high temperature is remarkably improved by incorporating the pyridine-based additive containing two nitrile groups, thereby showing excellent safety and excellent discharging characteristics.

In addition, the lithium secondary battery comprising the non-aqueous electrolyte solution for the lithium secondary battery according to the present invention exhibits an effect of improving the swelling characteristics of the battery, by suppressing the leaching of transition metals from the positive electrode under high voltage and reducing the amount of gas generated at high temperature, while maintaining good basic performance of high rate charging/discharging characteristics, lifetime characteristics, etc.

BEST MODE

The embodiments provided according to the present invention can all be achieved by the following description. It is to be understood that the following description describes preferred embodiments of the present invention, and it should be understood that the present invention is not necessarily limited thereto.

The present invention provides a non-aqueous electrolyte solution for a lithium secondary battery comprising a lithium salt, an organic solvent, and a pyridine-based additive containing two nitrile groups.

The pyridine-based additive containing the two nitrile groups may be a compound represented by the following Chemical Formula 1:

[Chemical Formula 1]

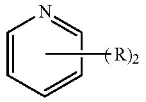

wherein R is -L-CN, and L is an alkylene group.

In addition, the compound represented by the Chemical Formula 1 may preferably be a compound represented by the following Chemical Formula 1-1:

[Chemical Formula 1-1]

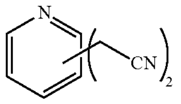

In addition, the compound represented by Chemical Formula 1 may more preferably be any one of the compounds below:

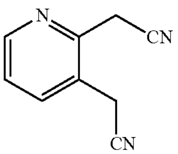
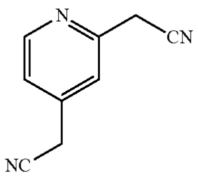
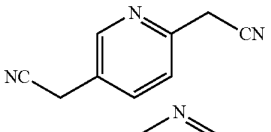
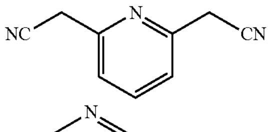
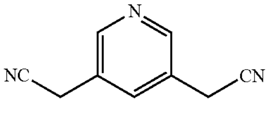
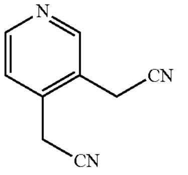

The non-aqueous electrolyte solution for lithium secondary battery of the present invention comprises a pyridine-based additive containing the two nitrile groups, and thus suppresses the reaction inside the battery, thereby significantly improving the swelling of the battery due to oxidation/decomposition of the electrolyte solution in a high voltage state, and exhibiting excellent storage characteristics under high temperature conditions as well as excellent discharging characteristics.

In this regard, when the additive containing the two nitrile groups is applied to the electrolyte, the nitrile group forms a bond with transition metal ions on the surface of the positive electrode to form a film of the positive electrode, thereby serving to inhibit the occurrence of side reactions due to direct contact between the positive electrode surface and the electrolyte. For this reason, the performance of the battery is improved by suppressing the generation of gas that can be generated at high temperature and the leaching of the transition metal, and this performance improvement is due to the combination of the transition metal ion and the nitrile group itself on the surface of the positive electrode.

In addition, when the pyridine-based additive containing the two nitrile groups is used, it exhibits a more excellent effect in improving the performance of the battery, as compared to the case containing one or three or more nitrile groups.

Specifically, when there is only one nitrile group, it is insufficient to sufficiently form a film on the surface of the positive electrode when a small amount is applied as an additive. In order to solve this problem, if the content of the additive is greatly increased, since it may cause a problem of increasing the resistance of the battery, the additive containing one nitrile group is not suitable as an additive for protecting the positive electrode of the battery. In addition, when there are three or more nitrile groups, the physical properties of the electrolyte solution may be deteriorated due to an increase in viscosity, etc., and the structure of the additive becomes too bulky and due to steric hindrance, and thus due to steric hindrance, it becomes difficult to effectively bind transition metal ions on the surface of the positive electrode. Therefore, it is preferable that the additive contains two nitrile groups.

Meanwhile, the nitrile group substituted into the pyridine-based additive is preferably an acetonitrile group. That is, as described above, when an acetonitrile group is contained as the nitrile group, it exhibits more excellent effect in improving the performance of the battery, as compared to the case where there is no linking group other than the acetonitrile group or the case where it is linked with an arylene group.

Specifically, when the nitrile group substituted into the pyridine-based additive is connected with an arylene group, there is a risk that a reduction reaction may easily occur due to the double bond present in the linking group, so that before the pyridine-based additive acts on the film of the positive electrode, the effect of the nitrile group cannot be sufficiently exerted at the positive electrode, while the reactivity at the negative electrode is increased. In addition, when the nitrile group is directly substituted into the pyridine structure without a linking group, since it tends to be lower in terms of the binding energy of the nitrile group and the transition metal ion, even if a bond is formed, it can be easily broken, as compared to the methylene group. Therefore, since it is disadvantageous in terms of the mechanism of forming a film on the positive electrode in the long term, it is advantageous in terms of film maintenance that the nitrile group is substituted through a methylene group as a linking group rather than directly substituted into the pyridine structure. That is, the nitrile group is preferably an acetonitrile group.

In addition, the non-aqueous electrolyte solution for the lithium secondary battery of the present invention may further comprise an additive selected from the group consisting of ithium difluoro oxalatoborate (LiFOB), lithium bisoxalatoborate ($LiB(C_2O_4)_2$, LiBOB), fluoroethylene carbonate (FEC), vinylene carbonate (VC), vinylethylene carbonate (VEC), divinyl sulfone, ethylene sulfite, propylene sulfite, diallyl sulfonate, ethane sulton, propane sulton (PS), butane sulton, ethene sulton, butene sulton, and propene sultone (PRS).

In addition, the content of the pyridine-based additive containing the two nitrile groups may be 0.01 wt. % to 10 wt. %, preferably 0.1 wt. % to 5 wt. %, more preferably 0.5 wt. % to 2 wt. %, relative to the total weight of the electrolyte solution. If the content of the pyridine-based additive is less than the above range, suppression of battery swelling during high voltage operation is insignificant, the improvement in capacity retention is insignificant or so on, that is, the additive effect does not appear, and the effect of improving the discharge capacity or output, etc. of the lithium secondary battery is insignificant. If the content of the pyridine-based additive exceeds the above range, there is a problem that the characteristics of the lithium secondary battery are rather deteriorated, such as the deterioration of the rapid lifetime. Therefore, it is preferable that the content of the pyridine-based additive satisfies the above range.

The non-aqueous electrolyte solution for the lithium secondary battery of the present invention may comprises a lithium salt, and the lithium salt may comprise at least one selected from the group consisting of LiCl, LiBr, LiI, $LiBF_4$, $LiClO_4$, $LiB_{10}Cl_{10}$, $LiAlCl_4$, $LiAlO_4$, $LiPF_6$, $LiCF_3SO_3$, $LiCH_3CO_2$, $LiCF_3CO_2$, $LiAsF_6$, $LiSbF_6$, $LiCH_3SO_3$, LiFSI (Lithium bis(fluorosulfonyl)imide, $LiN(SO_2F)_2$), LiBETI (lithium bisperfluoroethanesulfonimide, $LiN(SO_2CF_2CF_3)_2$) and LiTFSI (lithium (bis)trifluoromethanesulfonimide, and $LiN(SO_2CF_3)_2$).

The concentration of the lithium salt may be 0.1 M to 3.0 M, preferably 0.5 M to 2.5 M, and more preferably 0.8 M to 2.0 M. If the concentration of lithium salt is less than 0.1M, the conductivity of the electrolyte solution is lowered and the performance of the electrolyte solution is deteriorated. If the concentration of lithium salt exceeds 3.0 M, there is a problem in that the viscosity of the electrolyte solution is increased, and thus the mobility of lithium ions is decreased. Therefore, it is preferable that the concentration of lithium salt satisfies the above range. The lithium salt serves as a source of lithium ions in the battery, thereby enabling a basic operation of a basic lithium secondary battery.

In addition, in the non-aqueous electrolyte solution for lithium secondary battery of the present invention, lithium imide salt and lithium salt other than lithium imide salt can be used in a mixture.

The lithium imide salt may be at least one selected from the group consisting of LiFSI (Lithium bis(fluorosulfonyl) imide, $LiN(SO_2F)_2$), LiBETI (lithium bisperfluoroethanesulfonimide, $LiN(SO_2CF_2CF_3)_2$) and LiTFSI (lithium (bis) trifluoromethanesulfonimide, and $LiN(SO_2CF_3)_2$), and other types of lithium salt than lithium imide salt may be at least one selected from the group consisting of LiCl, LiBr, LiI, $LiBF_4$, $LiClO_4$, $LiB_{10}Cl_{10}$, $LiAlCl_4$, $LiAlO_4$, $LiPF_6$, $LiCF_3SO_3$, $LiCH_3CO_2$, $LiCF_3CO_2$, $LiAsF_6$, $LiSbF_6$, and $LiCH_3SO_3$.

In addition, the molar ratio of the lithium imide salt and other type of lithium salt than lithium imide salt is 1:1 to 7:1, preferably 1:1 to 6:1, more preferably 1:1 to 4:1. The imide lithium salt and a lithium salt other than the imide lithium salt satisfy the above molar ratio, thereby stably forming a film capable of suppressing corrosion of the current collector, even while suppressing side reactions of the electrolyte solution.

The non-aqueous electrolyte solution for the lithium secondary battery of the present invention may contain an organic solvent, and the organic solvent is a solvent commonly used in the lithium secondary battery, and for example, an ether compound, an ester (acetate, propionate) compound, an amide compound, a linear carbonate, or a cyclic carbonate compound may be used alone or in a mixture of two or more.

Among the compounds listed above, a mixture of linear carbonate and cyclic carbonate may be preferably used as the organic solvent. As an organic solvent, when a mixture of linear carbonate and cyclic carbonate is used, dissociation and movement of lithium salt can be facilitated. In this case, the cyclic carbonate-based compound and the linear carbonate-based compound are mixed in a volume ratio of 1:9 to 6:4, preferably 1:9 to 4:6, more preferably 2:8 to 4:6.

Meanwhile, the linear carbonate compound may comprise, as a specific example, one compound selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC) or a mixture of at least two or more, but is not limited thereto.

In addition, the cyclic carbonate compound may comprise, as a specific example, one compound selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and halides thereof or a mixture of at least two or more.

The lithium secondary battery of the present invention may have an operating voltage of 4.0V or higher, preferably an operating voltage of 4.1V or higher, and more preferably, an operating voltage of 4.2V or higher. If the operating voltage of the lithium secondary battery is less than 4.0V, the difference according to the addition of the pyridine-based additive of the present invention is not large. However, in a lithium secondary battery having an operating voltage of 4.0V or higher, it exhibits the effect of rapidly increasing high temperature storage stability and capacity characteristics depending on the addition of the additive.

Lithium Secondary Battery

Hereinafter, a lithium secondary battery according to the present invention will be described.

The lithium secondary battery of the present invention comprises a positive electrode, a negative electrode, a separator, and a non-aqueous electrolyte solution for a lithium secondary battery. More specifically, the lithium secondary battery comprises at least one positive electrode, at least one negative electrode, and a separator that may be selectively interposed between the positive electrode and the negative electrode, and the non-aqueous electrolyte solution for the lithium secondary battery as described above. At this time, since the non-aqueous electrolyte solution for the lithium secondary battery is the same as that described above, a detailed description thereof will be omitted.

(1) Positive Electrode

The positive electrode may be prepared by coating a slurry for a positive electrode active material including a positive electrode active material, an electrode binder, an electrode electrically conductive material, and a solvent on a positive electrode current collector.

The positive electrode current collector is not particularly limited as long as it has high electrical conductivity without causing chemical changes in the relevant battery. For example, stainless steel, aluminum, nickel, titanium, sintered carbon, or aluminum or stainless steel whose surface is treated with carbon, nickel, titanium, silver or the like may be used. In this case, the positive electrode current collector can have minute irregularities formed on its surface to enhance the bonding force with the positive electrode active material, and may be formed in various forms such as film, sheet, foil, net, porous body, foam, nonwoven fabric or the like.

The positive electrode active material is a compound capable of reversibly intercalating and de-intercalating lithium, and specifically, may comprise lithium composite metal oxide comprising lithium and at least one metal such as cobalt, manganese, nickel or aluminum. More specifically, the lithium composite metal oxide may be lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y1}Mn_{Y1}O_2$ (wherein, $0<Y1<1$), $LiMn_{2-z1}Ni_{z1}O_4$ (wherein $0<Z1<2$) etc.), lithium-nickel-cobalt-based oxide (e.g., $LiNi_{1-Y2}Co_{Y2}O_2$ (wherein $0<Y2<1$) etc.), lithium-manganese-cobalt-based oxide (e.g., $LiCo_{1-Y3}Mn_{Y3}O_2$ (wherein $0<Y3<1$), $LiMn_{2-z2}CO_{z2}O_4$ (wherein $0<Z2<2$) etc.), lithium-nickel-manganese-cobalt-based oxide (e.g., $Li(Ni_{p1}Co_{q1}Mn_{r1})O_2$ (wherein $0<p1<1$, $0<q1<1$, $0<r1<1$, $p1+q1+r1=1$) or $Li(Ni_{p2}CO_{q2}Mn_{r2})O_4$ (wherein $0<p><2$, $0<q2<2$, $0<r2<2$, $p2+q2+2=2$) etc.), or lithium-nickel-cobalt-transition metal (M) oxide (e.g., $Li(Ni_{p3}Co_{q3}Mn_{r3}M_{S1})O_2$ (wherein M is selected from the group consisting of Al, Fe, V, Cr, Ti, Ta, Mg and Mo, and p3, q3, r3 and s1 is the atomic fraction of each independent element, wherein $0<p3<1$, $0<q3<1$, $0<r3<1$, $0<s1<1$, $p3+q3+r3+s1=1$) etc.), and any one or two or more of these compounds may be comprised.

Among these, when considering that the capacity characteristics and stability of the battery can be increased, the lithium composite metal oxide may be $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$ etc.), or lithium nickel cobalt aluminum oxide (e.g., $LiNi_{0.8}Co_{0.15}Al_{0.05}O_2$ etc.), and when considering the remarkable improvement effect according to the control of the type and content ratio of elemental elements forming lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$ or $Li(Ni_{0.8}Mn_{0.1}Co_{0.1})O_2$, and any one or a mixture of two or more of these may be used.

The binder for the electrode is a component that assists in bonding between the positive electrode active material and the electrically conductive material and bonding to the current collector. Specifically, the binder may be polyvinylidene fluoride, polyvinyl alcohol, carboxymethylcellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated-EPDM, styrene-butadiene rubber, fluorine rubber, various copolymers and the like.

The electrically conductive material for the electrode is a component for further improving the electrical conductivity of the positive electrode active material. The electrically conductive material for the electrode is not particularly limited as long as it has electrical conductivity without causing chemical changes in the battery, and for example, graphite; carbon-based material such as carbon black, acetylene black, Ketjen black, channel black, furnace black, lamp black, and thermal black; electrically conductive fibers such as carbon fibers and metal fibers; metal powders such as carbon fluoride, aluminum, and nickel powder; electrically conductive whiskers such as zinc oxide and potassium titanate; electrically conductive metal oxides such as titanium oxide; electrically conductive materials such as polyphenylene derivatives can be used. Specific examples of commercially available electrically-conductive materials may include acetylene black series of products from Chevron Chemical Company or Denka black (Denka Singapore Private Limited), products from Gulf Oil Company, Ketjen black, EC series (products from Armak Company), Vulcan XC-72 (products from Cabot Company) and Super P (products of Timcal Company).

The solvent may comprise an organic solvent such as N-methyl-2-pyrrolidone (NMP), and may be used in an amount to achieve a desirable viscosity when the positive electrode active material, and optionally the binder for the positive electrode and the electrically conductive material for the positive electrode and the like are comprised.

(2) Negative Electrode

In addition, the negative electrode may be manufactured by coating a slurry for a negative electrode active material comprising a negative electrode active material, a binder for an electrode and an electrically conductive material for an electrode on a negative electrode current collector. Meanwhile, as the negative electrode, a metal negative electrode current collector itself may be used as an electrode.

The negative electrode current collector is not particularly limited as long as it has high electrical conductivity without causing chemical changes in the battery, and for example, copper, stainless steel, aluminum, nickel, titanium, sintered carbon, or copper or stainless steel whose surface is treated with carbon, nickel, titanium silver or the like, or aluminum-cadmium alloy or the like may be used. Also, as in the positive electrode current collector, the negative electrode current collector can have minute irregularities formed on its surface to enhance the bonding force with the active material, and may be formed in various forms such as film, sheet, foil, net, porous body, foam, nonwoven fabric or the like.

The negative electrode active material may be at least one negative electrode active material selected from the group consisting of natural graphite, artificial graphite, carbonaceous materials; lithium-containing titanium composite oxide (LTO), Si, Sn, Li, Zn, Mg, Cd, Ce, Ni, or Fe metals (Me); alloys composed of the above metals (Me); oxide ($MeO_x$) of the above metals (Me); and a composite of the above metals (Me) and carbon.

Since the contents of the binder for the electrode, the electrically conductive material for the electrode, and the solvent are the same as those described above, a detailed description thereof will be omitted.

(3) Separator

As the separator, a conventional porous polymer film conventionally used as a separator, for example, a porous polymer film made of a polyolefin-based polymer such as ethylene homopolymer, propylene homopolymer, ethylene/butene copolymer, ethylene/hexene copolymer, and ethylene/methacrylate copolymer may be used alone or they may be laminated and used, or a conventional porous nonwoven fabric, for example, a non-woven fabric made of high melting glass fibers, polyethylene terephthalate fibers, or the like may be used, but is not limited thereto.

Hereinafter, a preferred example is presented to help the understanding of the present invention. However, the following Examples are provided for easier understanding of the present invention, and the present invention is not limited thereto.

EXAMPLE

1. Example 1

(1) Preparation of Non-Aqueous Electrolyte Solution for Lithium Secondary Battery Ethylene carbonate (EC):ethylmethyl carbonate (EMC) were mixed in a volume ratio of 30:70 and then dissolved so that the concentration of $LiPF_6$ (lithium hexafluorophosphate) was 1.0M to prepare a non-aqueous organic solvent. To 99.5 g of the non-aqueous organic solvent, 0.5 g of 2,6-pyridinediacetonitrile as an additive was added to prepare a non-aqueous electrolyte solution for a lithium secondary battery.

(2) Manufacture of Lithium Secondary Battery

A positive electrode active material ($LiNi_{0.8}Co_{0.1}Mn_{0.1}O_2$; NCM811), carbon black as an electrically conductive material, and polyvinylidene fluoride (PVDF) as a binder were mixed in a weight ratio of 94:3:3, and then, the mixture obtained was added to N-methyl-2-pyrrolidone (NMP) as a solvent to prepare a slurry for the positive electrode active material. The slurry for the positive electrode active material was applied to an aluminum (Al) thin film, which is a positive electrode current collector, having a thickness of about 20 μm, dried, and after preparing a positive electrode, a roll press was performed to prepare a positive electrode.

Graphite as a negative electrode active material, polyvinyllidene difluoride (PVDF) as a binder, and carbon black as an electrically conductive material were mixed in a weight ratio of 95:2:3, and then the obtained mixture was added to N-methyl-2-pyrrolidone (NMP) as a solvent to prepare a slurry for a negative electrode active material. The slurry for the negative electrode active material was applied to a copper (Cu) thin film, which is a negative electrode current collector, having a thickness of 10 μm, dried, and after preparing a negative electrode, a roll press was performed to prepare a negative electrode.

The positive electrode, the negative electrode, and the separator made of polypropylene/polyethylene/polypropylene (PP/PE/PP) were stacked in the order of positive electrode/separator/negative electrode, and the stacked structure was placed in a pouch-type battery case, and then the non-aqueous electrolyte solution for the lithium secondary battery was injected to manufacture a lithium secondary battery.

2. Example 2

A non-aqueous electrolyte solution for a lithium secondary battery and a lithium secondary battery were prepared in the same manner as in Example 1, except that 2 g of 2,6-pyridinediacetonitrile as an additive was added to 98 g of non-aqueous organic solvent.

3. Example 3

A non-aqueous electrolyte solution for a lithium secondary battery and a lithium secondary battery were prepared in the same manner as in Example 1, except that 0.5 g of 2,5-pyridinediacetonitrile as an additive instead of 0.5 g of 2,6-pyridinediacetonitrile was added.

Comparative Example

1. Comparative Example 1

A non-aqueous electrolyte solution for a lithium secondary battery and a lithium secondary battery were prepared in the same manner as in Example 1, except that when preparing the electrolyte solution for the lithium secondary batteries, 2,6-pyridinediacetonitrile was not used as an additive.

2. Comparative Example 2

A non-aqueous electrolyte solution for a lithium secondary battery and a lithium secondary battery were prepared in the same manner as in Example 1, except that 0.5 g of 1,4-phenylenediacetonitrile as an additive instead of 0.5 g of 2,6-pyridinediacetonitrile was added.

3. Comparative Example 3

A non-aqueous electrolyte solution for a lithium secondary battery and a lithium secondary battery were prepared in the same manner as in Example 1, except that 10 g of 2,6-pyridinediacetonitrile was added as an additive.

The components and contents of the additive used in Examples 1 to 3 and Comparative Examples 1 to 3 are shown in Table 1 below.

TABLE 1

| | Kind of additive | Content of additive (wt. %) |
|---|---|---|
| Example 1 | 2,6-pyridinediacetonitrile | 0.5 |
| Example 2 | 2,6-pyridinediacetonitrile | 2 |
| Example 3 | 2,5-pyridinediacetonitrile | 0.5 |
| Comparative Example 1 | — | 0 |
| Comparative Example 2 | 1,4-phenylenediacetonitrile | 0.5 |
| Comparative Example 3 | 2,6-pyridinediacetonitrile | 10 |

Experimental Example

1. Experimental Example 1: Evaluation of the Rate of Increase in Thickness Upon Storage at High Temperature The lithium secondary batteries of Examples 1 to 3 and Comparative Examples 1 to 3 were charged up to 4.2V/0.05 C mA at room temperature under the condition of 0.33 C/4.2V constant current/constant voltage (CC/CV), and discharged to 3V under the condition of 0.33 C constant current (CC).

Then, after setting the state of charge (SOC) to 100% of each lithium secondary battery, the thickness of the lithium secondary battery was measured. This is defined as the initial thickness.

Next, the lithium secondary battery was stored at a high temperature by leaving it in an oven at 60° C. (OF-02GW, manufactured by Jeotech company) for 4 weeks, and then cooled at room temperature for 24 hours, and then the thickness of the lithium secondary battery was measured. The increase rate (%) of the thickness was calculated by substituting each of the measured values of the initial thickness and the thickness after storage at a high temperature into Equation 1 below, and is shown in Table 2.

Increase rate of thickness (%)={(thickness after storage at a high temperature−initial thickness)/initial thickness}×100(%) [Equation 1]

TABLE 2

| | Increase rate of thickness (%) |
|---|---|
| Example 1 | 7.4 |
| Example 2 | 6.8 |
| Example 3 | 8.4 |
| Comparative Example 1 | 18.6 |
| Comparative Example 2 | 14.9 |
| Comparative Example 3 | 12.2 |

Referring to Table 2, it was confirmed that in the case of the lithium secondary batteries according to Examples 1 to 3, the increase rate of the thickness is lower than that of the lithium secondary batteries according to Comparative Examples 1 to 3.

This is interpreted as due to the inhibitory effect of the following 2,6-pyridinediacetonitrile and 2,5-pyridinediacetonitrile on gas generation at high temperature.

First, the inhibitory effect of gas generation at the high temperature is due to the Lewis base characteristic of the pyridine structure.

Specifically, the Lewis basic properties of the pyridine structure combine with the Lewis acid properties of $PF_5$ generated in an electrolyte using a $LiPF_6$ salt to stabilize $PF_5$, thereby inhibiting $PF_5$ from generating HF. As a result, the generation of HF at high temperature is reduced, thereby suppressing the degradation of the surface of the positive electrode, the occurrence of side reactions, and the decomposition of the electrolyte solution, and thus reducing the generation of gas at high temperature and reducing the thickness after storage at high temperature.

Second, the suppression effect of the generation of gas at high temperature is due to the protective effect of the positive electrode by the diacetonitrile functional group.

Specifically, the functional group forms a bond with a transition metal ion on the surface of the positive electrode to form a film of the positive electrode, and serves to suppress the occurrence of side reactions due to direct contact of the electrolyte with the surface of the positive electrode. For this reason, the generation of the gas that can be generated at high temperature and the leaching of the transition metal are suppressed, and as a result, the thickness after storage at the high temperature is reduced.

Therefore, it was confirmed that by adding the pyridine-based additive containing two nitrile groups according to the present invention, excellent high-temperature storage stability is exhibited.

2. Experimental Example 2: Evaluation of Capacity Retention Rate During High-Temperature Storage The lithium secondary batteries of Examples 1 to 3 and Comparative Examples 1 to 3 were charged up to 4.2V/0.05 C mA at room temperature under the condition of 0.33 C/4.2V constant current/constant voltage (CC/CV), and discharged to 3V under the condition of 0.33 C constant current (CC). At this time, the shown discharge capacity is defined as the initial capacity (mAh).

Then, after setting the state of charge (SOC) to 100% of each lithium secondary battery, the lithium secondary battery was stored at a high temperature by leaving it in an oven at 60° C. (OF-02GW, manufactured by Jeotech company) for 4 weeks, and then cooled at room temperature for 24 hours. Thereafter, the lithium secondary batteries were discharged to 3V under the condition of 0.33 C constant current (CC), and then the condition of charging up to 4.2V/0.05 C mA under the condition of 0.33 C/4.2V constant current/constant voltage (CC/CV) as in the measurement of the initial capacity and discharging to 3V under the condition of 0.33 C constant current (CC) was repeated three times. In this case, the last $3^{rd}$ discharge capacity is defined as the capacity after storage at high temperature (mAh).

The capacity retention rate (%) was calculated by substituting each of the measured values of the initial capacity and the capacity after storage at high temperature in Equation 2 below, and is shown in Table 3 below.

Capacity retention rate (%)=(capacity after storage at high temperature (mAh)/initial capacity (mAh))×100(%) [Equation 2]

TABLE 3

| | Capacity retention rate (%) |
|---|---|
| Example 1 | 94.7 |
| Example 2 | 93.3 |
| Example 3 | 94.4 |
| Comparative Example 1 | 92.6 |
| Comparative Example 2 | 93.1 |
| Comparative Example 3 | 91.4 |

Referring to Table 3, it was confirmed that in the case of the lithium secondary batteries according to Examples 1 to 3, the capacity retention rate after storage at high temperature was excellent, as compared to lithium secondary batteries according to Comparative Examples 1 to 3.

As described in Experimental Example 2, the excellent effect of capacity retention rate after storage at high temperature is the result of stabilization of PF5 for suppression of HF generation under high temperature of additive of 2,6-pyridinediacetonitrile and suppression of degradation of positive electrode by film formation of the positive electrode.

Meanwhile, as in Comparative Example 3, it was confirmed that if excess additive is applied, since the resistance at the surface of the electrode was excessively increased, the capacity retention rate was rather reduced regardless of the suppression of gas generation.

Therefore, it was confirmed that by adding the pyridine-based additive containing two nitrile groups according to the present invention, the capacity retention rate after storage at a high temperature was excellent.

All simple modifications and variations of the present invention fall within the scope of the present invention, and the specific scope of protection of the present invention will become apparent from the appended claims.

The invention claimed is:

1. A non-aqueous electrolyte solution for a lithium secondary battery, comprising a lithium salt, an organic solvent, and a pyridine-based additive represented by Chemical Formula 1:

[Chemical Formula 1]

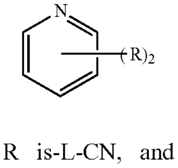

wherein R is-L-CN, and L is an alkylene group.

2. The non-aqueous electrolyte solution for the lithium secondary battery according to claim 1, wherein the pyridine-based additive is represented by Chemical Formula 1-1:

[Chemical Formula 1-1]

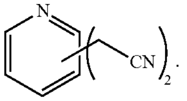

3. The non-aqueous electrolyte solution for the lithium secondary battery according to claim 1, wherein the pyridine-based additive is represented by any one of the following compounds:

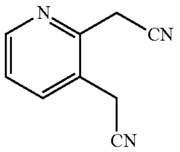
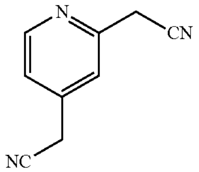
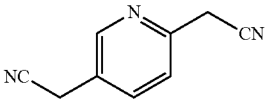
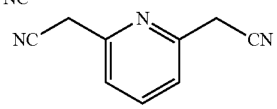
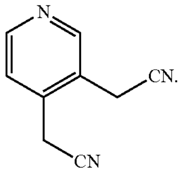
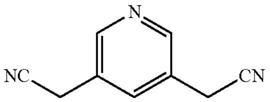

4. The non-aqueous electrolyte solution for the lithium secondary battery according to claim 1, wherein the pyridine-based additive is contained in an amount of 0.01 wt. % to 10 wt. %, relative to a total weight of the non-aqueous electrolyte solution.

5. The non-aqueous electrolyte solution for the lithium secondary battery according to claim 1, wherein the lithium salt is selected from the group consisting of LiCl, LiBr, LiI, $LiBF_4$, $LiClO_4$, $LiB_{10}Cl_{10}$, $LiAlCl_4$, $LiAlO_4$, $LiPF_6$, $LiCF_3SO_3$, $LiCH_3CO_2$, $LiCF_3CO_2$, $LiAsF_6$, $LiSbF_6$, $LiCH_3SO_3$, $LiN(SO_2F)_2$, $LiN(SO_2CF_2CF_3)_2$, and $LiN(SO_2CF_3)_2$.

6. The non-aqueous electrolyte solution for the lithium secondary battery according to claim 1, wherein the lithium salt has a concentration of 0.1 M to 3 M.

7. The non-aqueous electrolyte solution for the lithium secondary battery according to claim 1, wherein the organic solvent contains at least of ether, ester, amide, linear carbonate, or cyclic carbonate.

8. The non-aqueous electrolyte solution for the lithium secondary battery according to claim 1, wherein the pyridine-based additive is contained in an amount of 0.01 wt. % to 5 wt. %, relative to a total weight of the electrolyte solution.

9. A lithium secondary battery comprising a positive electrode, a negative electrode, a separator interposed between the positive electrode and the negative electrode, and the non-aqueous electrolyte solution for the lithium secondary battery according to claim 1.

10. The lithium secondary battery of claim 9, wherein the lithium secondary battery has an operating voltage of 4.0V or higher.

* * * * *